Figure 1:
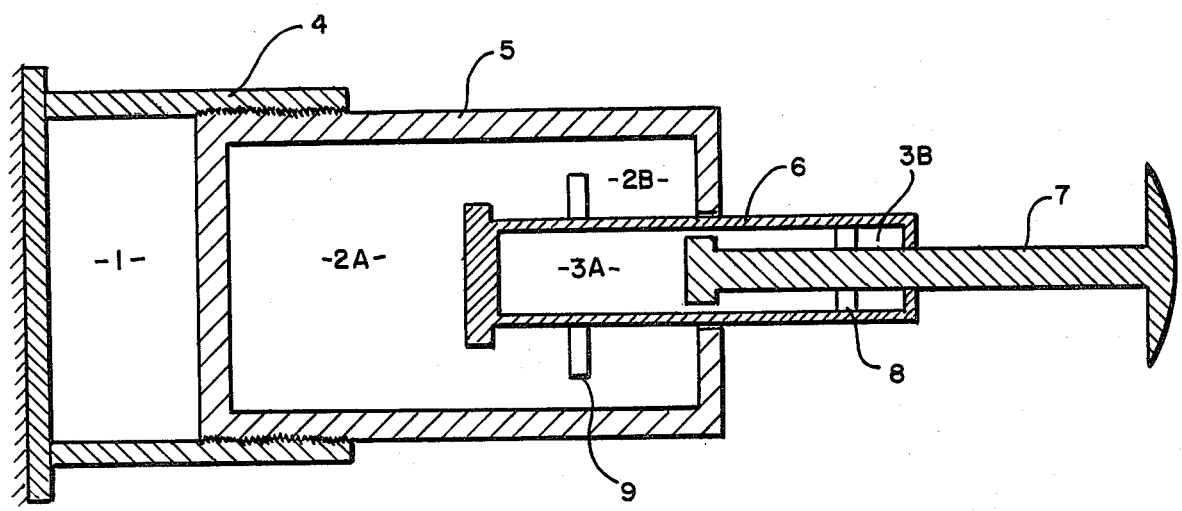

United States Patent [19]

Maciejewski

[11] 4,307,794
[45] Dec. 29, 1981

[54] APPARATUS FOR ABSORBING MECHANICAL ENERGY, IN PARTICULAR ENERGY OF VERY STRONG SHOCKS

[75] Inventor: Jeremi Maciejewski, Warsaw, Poland

[73] Assignee: Institut Chemii Przemyslowej, Warsaw, Poland

[21] Appl. No.: 25,091

[22] Filed: Mar. 29, 1979

[30] Foreign Application Priority Data

Apr. 17, 1978 [PL] Poland .................................. 206170

[51] Int. Cl.³ .............................................. F16F 9/30
[52] U.S. Cl. ..................................... 188/268; 267/152
[58] Field of Search ............... 188/266, 268, 311, 316; 267/35, 128, 139, 152, 153

[56] References Cited

U.S. PATENT DOCUMENTS

| 3,417,660 | 12/1968 | Harbrecht | 188/268 |
| 3,877,552 | 4/1975 | Higginson et al. | 188/268 |
| 4,085,832 | 4/1978 | Gains et al. | 188/268 |

FOREIGN PATENT DOCUMENTS

| 1152579 | 8/1963 | Fed. Rep. of Germany | 267/139 |
| 1372781 | 8/1964 | France | 267/35 |
| 1398858 | 4/1965 | France | 267/153 |
| 1227359 | 4/1971 | United Kingdom | 267/152 |

*Primary Examiner*—Edward R. Kazenske

[57] ABSTRACT

This invention relates to an apparatus for absorption of mechanical energy, particularly energy of very strong shocks. It comprises an immobile cylinder and, inserted in it in telescopic fashion, a mobile part consisting of at least one mobile cylinder with a bottom and a mobile plunger inserted into the last cylinder, the empty space between the cylinders and between the last cylinder and the plunger being filled with a medium absorbing energy of shocks and vibrations and being characterized by viscous flow in static state and by high elasticity in dynamic state. Any of the mobile cylinders is provided with a plunger and a baffle dividing the cylinder into two chambers, one chamber being filled with a visco-elastic medium absorbing mechanical energy, and the other chamber being filled with a visco-elastic medium compressed to a pressure higher than 1000 h Pa.

5 Claims, 2 Drawing Figures

APPARATUS FOR ABSORBING MECHANICAL ENERGY, IN PARTICULAR ENERGY OF VERY STRONG SHOCKS

The invention relates to an apparatus for absorbing mechanical energy, particularly energy of very strong shocks and constitutes a modification of the apparatus claimed in U.S. patent application Ser. No. 904,501, filed May 10, 1978, now U.S. Pat. No. 4,235,317. The apparatus according to the present invention is used for absorbing energy of shocks in rail and automotive vehicles, etc, as a bump stop for elevators, travelling cranes, lifts, etc and for damping vibrations.

The hitherto known apparatus for absorbing mechanical energy described in patent application Ser. No. 904,501 is characterized in that it can function simultaneously as a device for absorbing mechanical energy, a damper for vibrations of various amplitudes and a bump stop. The apparatus comprises two parts: an immobile cylindrical part and a mobile part inserted in it in a telescopic fashion, consisting of at least one mobile cylinder with a bottom and of a mobile plunger inserted into the last cylinder. The empty space between cylinders and between the last cylinder and the plunger is filled with media absorbing energy of shocks and vibrations, characterized by elasticity change and contribution of viscous properties increasing in the direction from the immobile cylinder to the plunger, advantageously using polysiloxase polymers as the media.

The media in at least one of the cylinders is characterized by a viscous flow under static conditions and by high elasticity under dynamic conditions.

The apparatus described in Ser. No. 904,501 has, however the disadvantage of using a conventional system of springs for tightening seals against the medium in the cylinder and maintaining in stressed state the medium in mobile cylinders during compensation of rapidly increasing pressure of shock.

Viscoelastic absorbing medium stressed during action of the absorbing apparatus is relaxed while flowing between walls of the cylinder and of the plunger. As the flow is of elastic character, pressure exerted by the medium upon walls of the cylinder, the plunger and the seal tightened with a spring is not uniform and there are spaces with a higher or a lower pressure. The spring, displaying no viscous properties and no gradually changeable compressibility, behaves in this dynamic system as a rigid body as long as the force characteristic for the spring is not exceeded. This characteristic results in a decrease of energy absorbing capacity and complicates significantly the design of the absorbing apparatus. Moreover, in order to direct pressure of the flowing medium upon the seal tightened with the spring instead of the walls of the cylinder, moulding of the plunger or of the cylinder-plunger by rounding off the edges, moulding of the pin in a shape similar to that of the plunger, etc, is necessary.

It was found unexpectedly that disadvantages of the apparatus according to application Ser. No. 904,501 can be eliminated by the use of modified mobile cylinders, functioning as plungers and making it possible to remove the inconvenient springs.

According to the present invention and thanks to a new design of the apparatus, instead of conventional springs used for maintaining the energy absorbing visco-elastic media in the cylinders in a stressed state, suitably chosen visco-elastic media are applied, compressed initially up to a pressure higher than 1000 h Pa and usually to a pressure exerted by springs according to patent application Ser. No. 904,501. In a practical embodiment of the invention there are used additional baffles, made of teflon, polyamide, rigid rubber, or metals, depending on the working conditions of the apparatus and on the pressures in it. These baffles are located at the mobile cylinders, serving as plungers and at the plunger. The baffles divide both the cylinders with, inserted in them in telescopic fashion, cylinder-plungers and the plunger into two chambers. Both chambers are filled with the same or different viscoelastic medium of the type of polysiloxane polymers, liquid halogen-containing organic polymers, aliphatic alcohols and polyalcohols. The medium filling the chamber into which the cylinder-plunger or the plunger is inserted absorbs mechanical energy, whereas the medium filling the other chamber behind the baffle maintains the medium in the first chamber in a stressed state similarly to the spring. Such conditions are obtained by compressing the medium in the second part of the cylinder to a pressure higher than 1000 hPa. With a suitably chosen baffle, the medium filling the rear chamber of the cylinder ensures a spontaneous backward movement of the plunger or of cylinder-plungers.

Any of the baffles, according to the invention, divides the cylinder into two chambers in a proportion of 1:1 to 1:0.01 and the ratio of the baffle diameter of the internal diameter of the cylinder-plunger is from 0.999:1 to 0.1:1.

A variant of an apparatus for absorption of mechanical energy according to the invention consists of immobile and mobile parts of a modified design.

The immobile part of the apparatus is a cylinder and the mobile part comprises a plunger inserted into the immobile cylinder and supported upon an elastic medium and a mobile cylinder inserted in a telescopic fashion.

The mobile cylinder is divided with a baffle located at the plunger into two chambers. Both chambers are filled with the same medium or with different viscoelastic media of the type of polysiloxane polymers, liquid halogen-containing organic polymers, aliphatic alcohols and polyalcohols. Then medium in the first chamber, located between the bottom of the mobile cylinder and the baffle, is compressed to a pressure higher than 1000 hPa. The second chamber of this cylinder, located behind the baffle, is filled with a medium absorbing mechanical energy.

The baffle divides the mobile cylinder in a proportion of 1:1 to 1:0.01 and the ratio of diameter of the baffle to the internal diameter of the cylinder is from 0.999:1 to 0.1:1.

Application of baffles in modified apparatuses for the absorption of mechanical energy makes it possible to direct the flow of visco-elastic medium during movement of the plunger in the cylinder.

The flow of visco-elastic media resulting from external force is different from the flow of viscous liquids. The flow is of plastic character: the layer adjacent to the walls of the cylinder does not move, whereas the medium flows only in the middle of the ring formed between the cylinder and the plunger. Therefore the baffle takes over the pressure of the flowing medium and dissipates energy in the medium used instead of the spring, pressing the medium with its whole surface. During a backward movement of the plunger, the baffle presses the energy absorbing medium with its whole surface and therefore the backward movement is much faster than in a solution according to application Ser. No. 904,501.

Application of baffles and suitably chosen and compressed to high pressures visco-elastic media, instead of a metal spring, has the additional advantage of prolonging the service life of the apparatus. Frequent straining of the metal spring results in diminishing its dimensions as well as in reducing the pressure exerted by it upon an energy absorbing medium, the situation being unlike that obtaining in the apparatus according to present invention.

Figure 2:
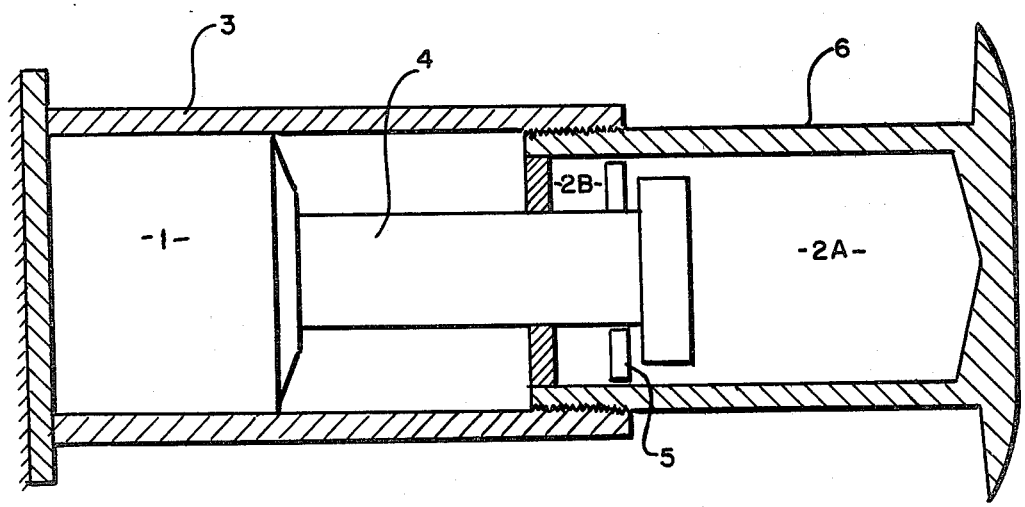

Both variants of the present invention are illustrated in FIG. 1, showing in a schematic way a cross-section of a device with three cylinders and a mobile plunger, and in FIG. 2, showing in a schematic way a cross-section of an apparatus with two cylinders and a mobile cylinder.

In an apparatus with three cylinders (FIG. 1), cylinder 4 is filled with elastic medium 1, supporting cylinder 5, filled with visco-elastic medium 2A, absorbing mechanical energy, and with visco-elastic medium 2B, put behind a baffle 8 and compressed up to a pressure of 50,000 hPa. It is advantageous if in cylinder 5 there is a medium of the type of polysiloxane polymers.

Cylinder 6 is filled with medium 3A, providing a significant contribution of viscous properties, of the type of polysiloxane polymers, and with visco-elastic medium 3B, put behind baffle 9 and compressed up to a pressure of 160,000 h Pa. Plunger 7 moves in cylinder 6 and so takes over energy of shocks and vibrations. Energy of vibrations is damped in cylinder 6 with the help of medium 3A. Energy of strong shocks is transferred by cylinder 6, acting as a plunger, into medium 2A in cylinder 5. Elastic medium 1 absorbs any excess of energy in cases of exceeding the energy capacity of other portions of the apparatus.

In an apparatus with two cylinders (FIG. 2) the immobile cylinder 3 is filled with elastic medium 1, supporting plunger 4 inserted into mobile cylinder 6. Mobile cylinder 6 is filled with visco-elastic medium 2A of the type of polysiloxane polymers being compressed with the help of visco-elastic medium 2B which is compressed to a pressure of 500,000 h Pa and separated from medium 2A with baffle 5. For absorption of very high energies, cylinder 6 is filled with the same medium. In the device shown in FIG. 2, energy of vibrations is damped by elastic medium 1 and energy of shocks by medium 2A.

I claim:

1. In apparatus for absorption of mechanical energy, particularly energy of very strong shocks, comprising two parts: an immobile cylinder and a mobile part inserted telescopically therein, said mobile part comprising one or more telescopically arranged movable cylinders each having a bottom and a piston inserted into the last of said telescopically arranged movable cylinders; the space within the immmobile cylinder and the movable cylinders being filled with media for absorbing energy of shocks and vibrations, the media in the immobile cylinder having the highest elasticity and the media in the last of the movable cylinders having the lowest elasticity and a viscous flow in the static state and a high elasticity in dynamic state; the improvement wherein at least one of the movable cylinders is provided with a mobile baffle dividing the same into two chambers, the first chamber being filled with a viscoelastic medium selected from the group consisting of polysiloxane polymers, liquid halogen-containing polymers, aliphatic alcohols and polyalcohols, and the second chamber being filled with a medium selected from said group compressed to a pressure higher than 1000 h Pa, such compression of the latter medium causing the medium in said first chamber to be maintained in a stressed state.

2. The apparatus according to claim 1 wherein said piston protrudes outwardly from the last of said movable cylinders.

3. The apparatus according to claim 1 wherein said piston extends into said immobile cylinder as well as into the movable cylinder sliding telescopically into said immobile cylinder.

4. The apparatus according to claim 1, 2 or 3, wherein the two chambers separated by said mobile baffle have a proportion of 1:1 to 1:0.01 and the ratio of the diameter of the mobile baffle forming said chambers to the internal diameter of the cylinder in which the mobile baffle is located is from 0.999:1 to 0.1:1.

5. The apparatus according to claim 1, 2 or 3, wherein the baffle is made of a material selected from the group consisting of teflon, polyamide, hard rubber and metal.

* * * * *